(12) United States Patent
Likhachev et al.

(10) Patent No.: US 10,730,521 B2
(45) Date of Patent: Aug. 4, 2020

(54) SYSTEM FOR AUTONOMOUS LANE MERGING

(71) Applicants: DENSO International America, Inc., Southfield, MI (US); RobotWits LLC, Pittsburgh, PA (US)

(72) Inventors: Maxim Likhachev, Pittsburgh, PA (US); Ellis Marshal Ratner, Pittsburgh, PA (US); Lu Lyu, Pittsburgh, PA (US); Yunfei Xu, Milpitas, CA (US); Takashi Bando, Mountain View, CA (US); Jonathan Michael Butzke, Pittsburgh, PA (US)

(73) Assignees: DENSO International America, Inc., Southfield, MI (US); RobotWits, LLC, Pittsburgh, PA (US)

( * ) Notice: Subject to any disclaimer, the term of this patent is extended or adjusted under 35 U.S.C. 154(b) by 213 days.

(21) Appl. No.: 15/974,991

(22) Filed: May 9, 2018

(65) Prior Publication Data
US 2019/0193737 A1 Jun. 27, 2019

Related U.S. Application Data

(60) Provisional application No. 62/608,794, filed on Dec. 21, 2017.

(51) Int. Cl.
*B60W 30/18* (2012.01)
*G05D 1/00* (2006.01)
*G05D 1/02* (2020.01)

(52) U.S. Cl.
CPC ..... *B60W 30/18163* (2013.01); *G05D 1/0088* (2013.01); *G05D 1/0212* (2013.01); *G05D 1/0289* (2013.01); *B60W 2554/801* (2020.02); *B60W 2554/804* (2020.02); *G05D 2201/0213* (2013.01)

(58) Field of Classification Search
CPC .......... B60W 30/18163; G05D 1/0088; G05D 1/0212; G05D 1/0289
See application file for complete search history.

(56) References Cited

U.S. PATENT DOCUMENTS

8,788,134 B1 7/2014 Litkouhi et al.
9,475,491 B1 10/2016 Nagasaka et al.
(Continued)

*Primary Examiner* — Hussein Elchanti
(74) *Attorney, Agent, or Firm* — Harness, Dickey & Pierce, P.L.C.

(57) ABSTRACT

An autonomous drive system for a vehicle includes at least one environment perception sensor, a perception module, a location module, an intention prediction module, and a control module. The perception module is configured to receive signals from the at least one environment perception sensor and detect and track at least two remote vehicles in one or both of a current lane and a neighboring lane. The location module is configured to determine a location of the vehicle. The intention prediction module is configured to generate predicted trajectories for the at least two remote vehicles. The control module is configured to receive signals from the at least one environment perception sensor and receive the predicted trajectories from the intention prediction module. The control module determines a location and time for a lane change based on the predicted trajectories and controls the vehicle to change lanes at the determined location and time.

20 Claims, 5 Drawing Sheets

(56) References Cited

U.S. PATENT DOCUMENTS

| | | |
|---|---|---|
| 9,550,528 B1 | 1/2017 | Hakeem et al. |
| 9,775,004 B2 * | 9/2017 | Cawse .................. H04W 4/029 |
| 2005/0015203 A1 * | 1/2005 | Nishira ................. B60W 50/16 |
| | | 701/301 |
| 2010/0161192 A1 * | 6/2010 | Nara ................... B60W 40/072 |
| | | 701/70 |
| 2015/0321699 A1 | 11/2015 | Rebhan et al. |
| 2017/0018189 A1 * | 1/2017 | Ishikawa ............ B62D 15/0255 |
| 2018/0354518 A1 * | 12/2018 | Inou ....................... G08G 1/167 |
| 2019/0071099 A1 * | 3/2019 | Nishiguchi ........... B60W 30/12 |
| 2019/0084572 A1 * | 3/2019 | Oishi ................... B60W 50/02 |

* cited by examiner

SYSTEM FOR AUTONOMOUS LANE MERGING

CROSS-REFERENCE TO RELATED APPLICATIONS

This application claims the benefit of U.S. Provisional Application No. 62/608,794, filed on Dec. 21, 2017. The entire disclosure of the above application is incorporated herein by reference.

FIELD

The present disclosure relates to autonomous drive systems and, more specifically, a system for autonomous lane merging for vehicles.

BACKGROUND

This section provides background information related to the present disclosure which is not necessarily prior art.

The Society of Automotive Engineers (SAE) classifies autonomous drive (AD) systems into a variety of different categories based on functionality. Some AD systems are very basic, purely independent automated components (such as adaptive cruise control and emergency braking systems). Other more advanced AD systems are fully terrain-independent autonomous driving systems. A major difference between the basic and complex AD systems is that, with the complex AD systems, the responsibility to monitor current driving conditions is transferred from an operator to the autonomous drive system. Such complex AD systems must operate under dense traffic conditions, and, consequently, face numerous challenging driving situations. Merging into a densely populated lane is particularly difficult for traditional autonomous driving systems, as there is often a need to perform complex, human-like behaviors to successfully and comfortably negotiate these scenarios. For example, a traditional autonomous driving system may wait for a remote vehicle to let it in; whereas a human driver may make proactive moves, such as shift slowly over to communicate their intention to merge to the surrounding vehicles, which are, in turn, subsequently more likely to make space. The present disclosure addresses these differences and potential issues with the autonomous driving systems.

SUMMARY

This section provides a general summary of the disclosure, and is not a comprehensive disclosure of its full scope or all of its features.

An example autonomous drive system for a vehicle according to the present disclosure includes at least one environment perception sensor, a perception module, a location module, an intention prediction module, and a control module. The perception module is configured to receive signals from the at least one environment perception sensor and detect and track at least two remote vehicles in one or both of a current lane and a neighboring lane. The location module is configured to determine a location of the vehicle. The intention prediction module is configured to generate predicted trajectories for the at least two remote vehicles. The control module is configured to receive signals from the at least one environment perception sensor and receive the predicted trajectories from the intention prediction module. The control module determines a location and time for a lane change based on the predicted trajectories and controls the vehicle to change lanes at the determined location and time.

The control module of the autonomous drive system may complete a waiting to shift stage, a shifting stage, a waiting to merge stage, and a merging stage when the control module controls the vehicle to change lanes at the determined location and time.

The control module of the autonomous drive system may determine whether a distance between the vehicle and the at least two remote vehicles is less than a predetermined distance threshold and whether a difference in a velocity of the vehicle and a velocity of the at least two remote vehicles is less than a predetermined velocity threshold during the waiting to shift stage.

The control module of the autonomous drive system may shift the vehicle in a direction toward a lead vehicle of the at least two remote vehicles during the shifting stage.

The control module of the autonomous drive system may complete the shifting stage when the control module controls the vehicle to cross over a lane delimiter and into the neighboring lane.

The control module of the autonomous drive system may determine whether a distance between the at least two remote vehicles is greater than a predetermined distance threshold and whether a difference in a velocity of the vehicle and a velocity of the at least two remote vehicles is less than a predetermined velocity threshold during the waiting to merge stage.

The control module of the autonomous drive system may shift the vehicle into the neighboring lane from the current lane at the determined location and time during the merging stage.

The merging stage may be complete when the vehicle has completely crossed over the lane delimiter and the neighboring lane becomes the new current lane for the vehicle.

The control module of the autonomous drive system may initiate a merge failure recovery if a time spent in a stage exceeds a predetermined threshold and control the vehicle back into the current lane.

The control module of the autonomous drive system may initiate a merge failure recovery if an abort signal is received or if one of the at least two remote vehicles follows a path different than the projected trajectory that increases a risk as determined by the intention prediction module and control the vehicle back into the current lane.

An example method for controlling an autonomous vehicle according to the present disclosure includes determining, by a location module, a location of the vehicle; detecting and tracking, by a perception module, at least two remote vehicles in one or both of a current lane and a neighboring lane; generating, by an intention prediction module, predicted trajectories for the at least two remote vehicles; determining, by a control module, a location and time for a lane change based on the predicted trajectories for the at least two remote vehicles; and controlling, by the control module, the vehicle to change lanes at the determined location and time.

The method may further include completing, by the control module, a waiting to shift stage, a shifting stage, a waiting to merge stage, and a merging stage while controlling, by the control module, the vehicle to change lanes at the determined location and time.

The method may further include determining, by the control module, whether a distance between the vehicle and the at least two remote vehicles is less than a predetermined distance threshold and whether a difference in a velocity of the vehicle and a velocity of the at least two remote vehicles is less than a predetermined velocity threshold during the waiting to shift stage.

The method may further include shifting, by the control module, the vehicle in a direction toward a lead vehicle of the at least two remote vehicles during the shifting stage.

The method may further include completing, by the control module, the shifting stage when the vehicle crosses over a lane delimiter and into the neighboring lane.

The method may further include determining, by the control module, whether a distance between the at least two remote vehicles is greater than a predetermined distance threshold and whether a difference in a velocity of the vehicle and a velocity of the at least two remote vehicles is less than a predetermined velocity threshold during the waiting to merge stage.

The method may further include controlling, by the control module, the vehicle to change lanes between the current lane and the neighboring lane at the determined location and time during the merging stage.

The method may further include completing, by the control module, the merging stage when the vehicle has completely crossed over a lane delimiter and the neighboring lane becomes a new current lane for the vehicle.

The method may further include initiating, by the control module, a merge failure recovery if a time spent in a stage exceeds a predetermined time threshold, and controlling, by the control module, the vehicle back into the current lane.

The method may further include initiating, by the control module, a merge failure recovery if an abort signal is received or if one of the at least two remote vehicles follows a path different than the projected trajectory that increases a risk as determined by the intention prediction module, and controlling, by the control module, the vehicle back into the current lane.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein are interpreted accordingly.

As previously stated, merging into a densely populated lane is particularly difficult for traditional autonomous driving systems, as there is often a need to perform complex, human-like behaviors to successfully and comfortably negotiate these scenarios. For example, a traditional autonomous driving system may wait for a remote vehicle to let it in; whereas a human driver may make proactive moves, such as shift slowly to communicate their intention to merge to the surrounding vehicles (by, for example, slowly shifting over), which are, in turn, subsequently more likely to make space.

The present disclosure presents a novel framework that allows autonomous vehicles to produce robust behaviors that allow for merging safely, comfortably, and efficiently into dense traffic. It combines high-level planning under uncertainty to effectively reason about whether a neighboring or surrounding vehicle intends to let the autonomous vehicle merge with a low-level controller that produces trajectories resulting in a robust, human-like merge negotiation behavior.

The present disclosure plans high-quality merging behaviors under dense traffic conditions for an autonomous vehicle. Its presence within an automated driving architecture guarantees greater safety, comfort, and reliability in the often-encountered dense traffic condition. The system of the present disclosure automatically detects a need for merging and accomplishes a human-like negotiation of merging into dense traffic, whereby a proactive shifting behavior towards the target lane is executed by a low-level controller to disambiguate the intentions of the vehicles in the target lane. The system also achieves robustness by integrating robust planning under uncertainty about the intentions of vehicle in the other lanes, to ensure the vehicle merges only when there is sufficiently high probability of success.

Figure 1:
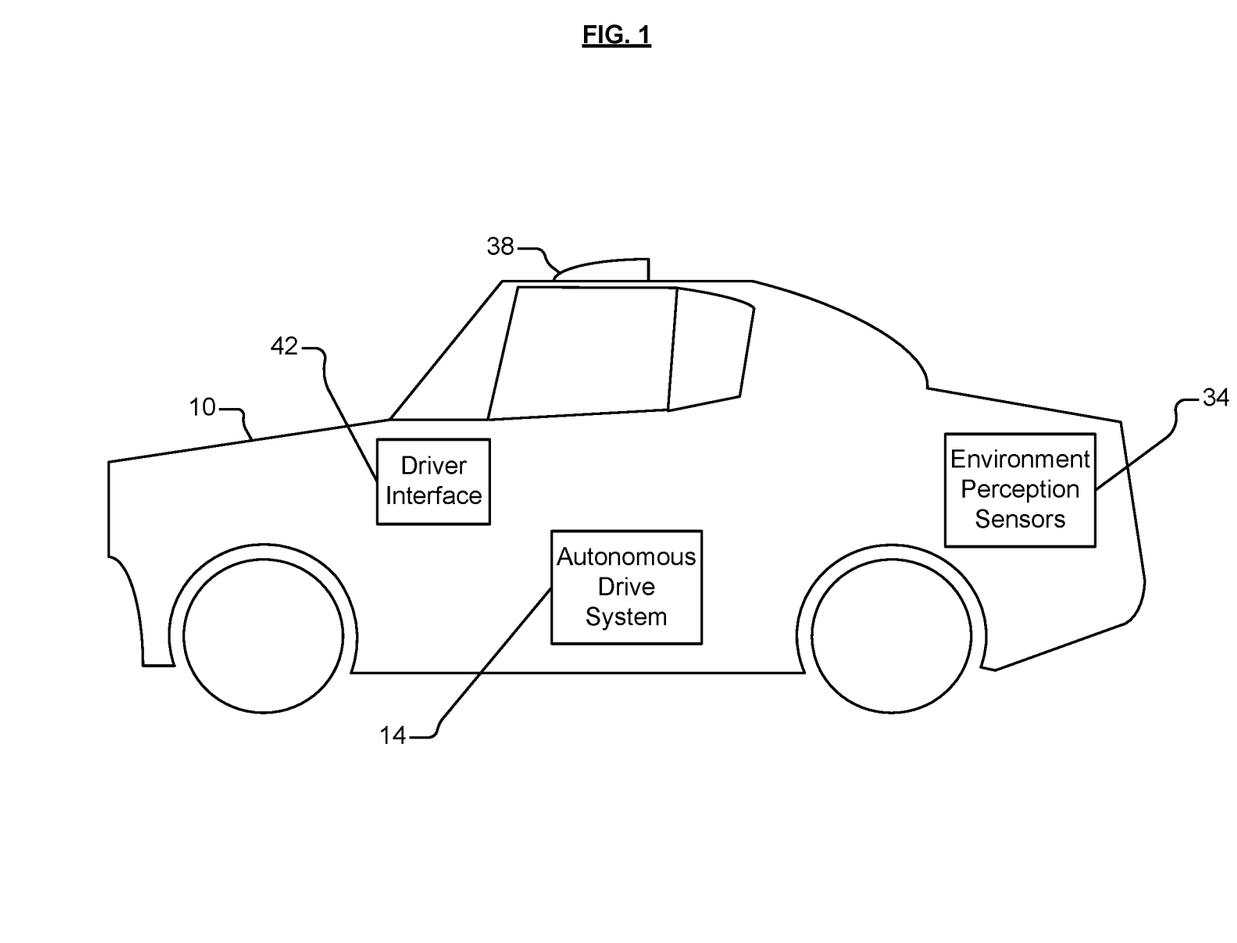
FIG. 1 illustrates an exemplary vehicle including an autonomous drive system in accordance with the present disclosure.

FIG. 1 illustrates a vehicle 10 having an autonomous drive system 14 in accordance with the present disclosure. The vehicle 10 may be any vehicle suitable for being outfitted with an autonomous drive system for autonomously driving the vehicle and monitoring driving conditions without requiring input from an operator. The vehicle 10 may be any suitable passenger vehicle, utility vehicle, commercial vehicle, recreational vehicle, mass transit vehicle, motorcycle, military vehicle/equipment, construction vehicle/equipment, etc.

Figure 2:
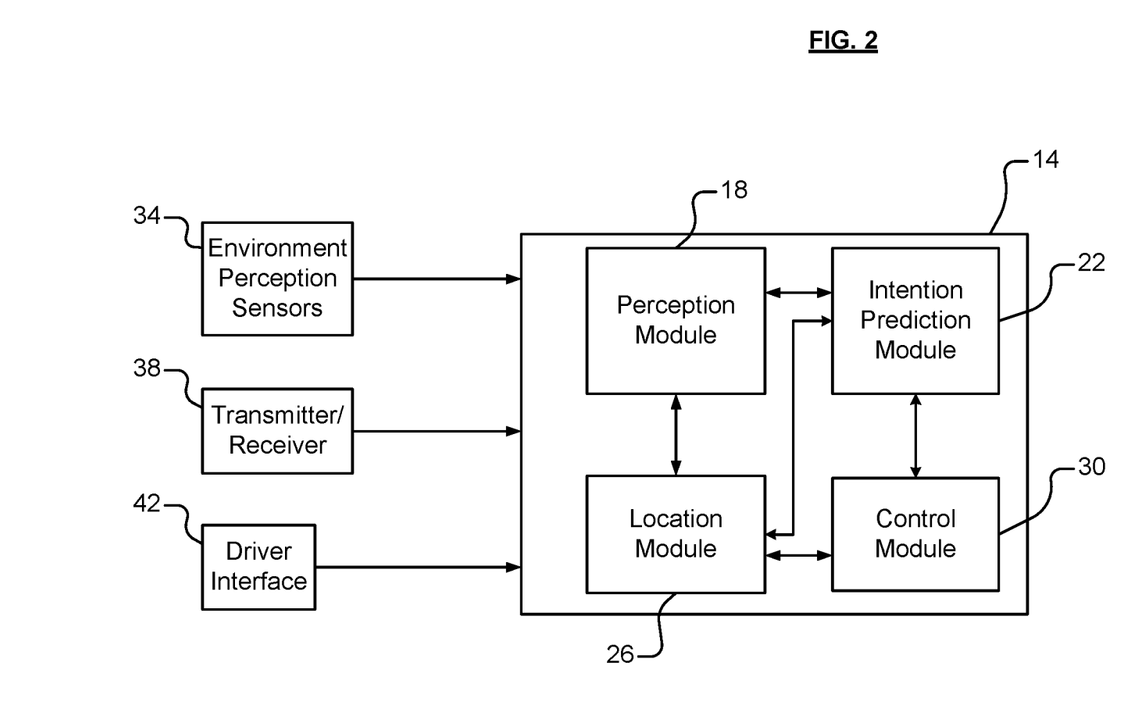
FIG. 2 illustrates a block diagram of the autonomous drive system in accordance with the present disclosure.

With additional reference to FIG. 2, the autonomous drive system 14 generally includes a perception module 18, an intention prediction module 22, a location module 26, and a control module 30. In this application, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The autonomous drive system 14 may communicate with environment perception sensors 34, a transmitter/receiver 38, and a driver interface 42 located throughout the vehicle 10, among other things. The environment perception sensors 34 are any sensors configured to sense/perceive/detect features of the environment about the vehicle 10, such as roadway boundaries, lane markers, other vehicles, pedestrians, buildings, tunnels, bridges, weather conditions, road conditions, and any other obstacles about the vehicle 10. The environment perception sensors 34 may also sense/perceive/detect/measure features of the vehicle 10, such as velocity, acceleration, and other vehicle parameters. The environment perception sensors 34 can include any suitable radar sensor, LIDAR sensor, sonar sensor, cameras, etc.

The transmitter/receiver 38 can be any suitable transmitter/receiver, such as for radio frequency transmission and reception. The transmitter/receiver 38 includes, for example, any suitable antenna mounted at any appropriate location about the vehicle 10.

The driver interface 42 may include any communication system with an operator of the vehicle. The driver interface 42 may include a driver input on the interior of the vehicle, such as, for example, on the dashboard or the display panel. The driver interface 42 may receive, among other things, instructions from the driver for destinations and/or preferred routes.

Figure 3:
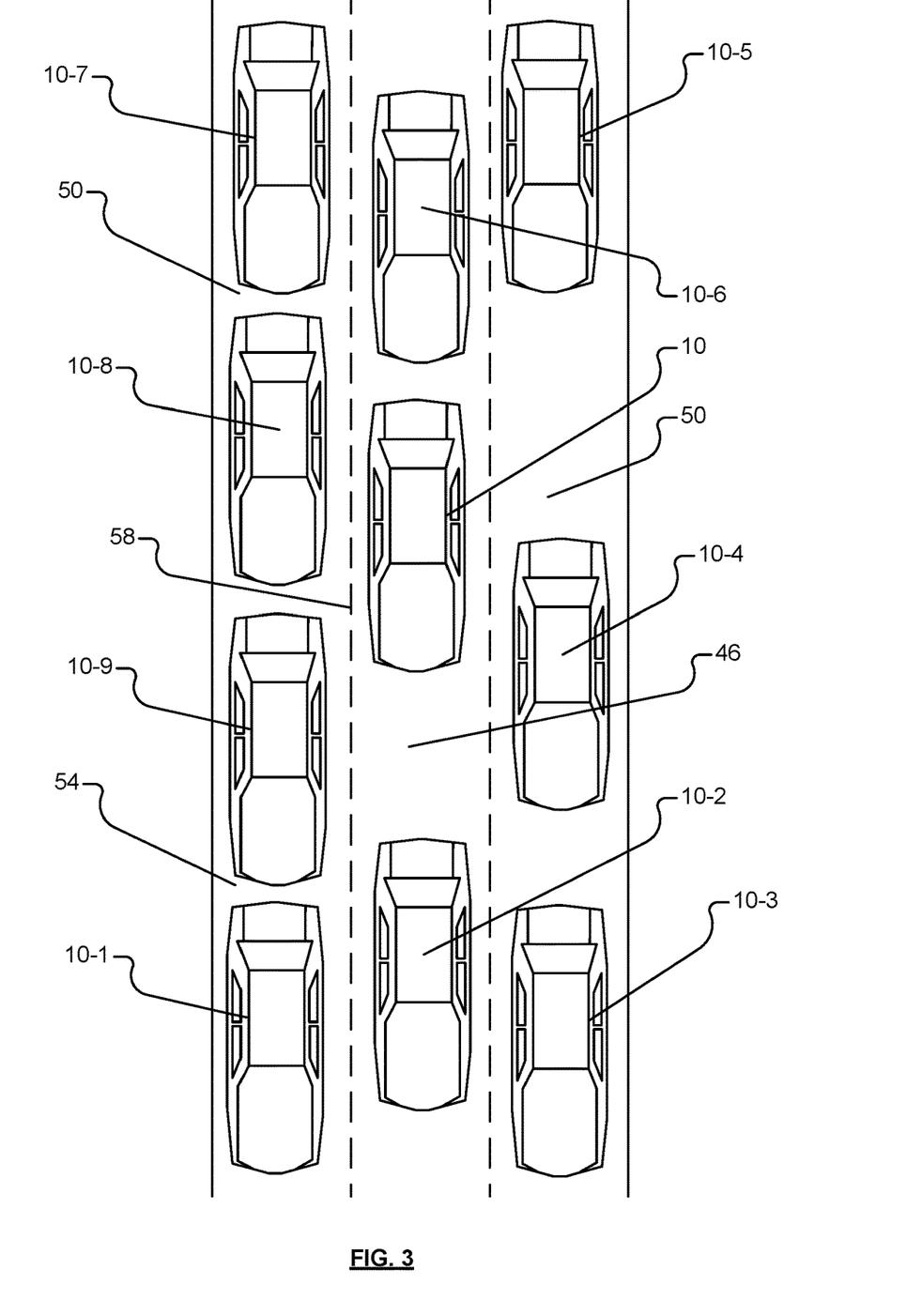
FIG. 3 illustrates an example dense traffic condition including the vehicle of FIG. 1.

The perception module 18 is configured to detect and track other vehicles on the road in both a current lane 46 of the vehicle 10 and neighboring lanes 50 (FIG. 3). The perception module 18 receives signals from the environment perception sensors 34 and the transmitter/receiver 38 including data on surrounding vehicles (for example, vehicles 10-1-10-9), such as, for example, position, velocity, acceleration, orientation, etc. The data may be measured, or estimated, data from the environment perception sensors 34 on the vehicle 10. The data may also be provided from the surrounding vehicles through vehicle-to-vehicle communication methods and received by the vehicle 10 transmitter/receiver 38.

The intention prediction module 22 communicates with the perception module 18. The intention prediction module 22 takes as input the states for the vehicles on the current 46 and neighboring 50 lanes and makes predictions as to their future behaviors in the form of time parameterized trajectories and associated likelihoods. For example, the intention prediction module 22 makes predictions as to whether the vehicles will speed up, slow down, maintain current velocities, maintain close following distances, allow gaps, change lanes, etc., and transmits these predictions as trajectories over estimated periods of times. The intention prediction module 22 outputs the predicted possible trajectories of the surrounding vehicles to the control module 30.

The location module 26 is configured to identify the location of the vehicle 10 in any suitable manner. For example, the location module 26 can include a GPS receiver configured to receive signals from GPS or GNSS satellites, and determine the location of the vehicle 10 based on the signals. The location module 26 may also be a combined GPS and IMU (inertial measurement unit) sensor. The location of the vehicle 10 can be transmitted by the transmitter/receiver 38 to other vehicles in the vicinity.

The control module 30 is configured to pilot the vehicle 10 without requiring input of an operator of the vehicle 10. Thus, the control module 30 is configured to receive initial instructions from the driver interface 42, receive signals from the environment perception sensors 34, the transmitter/receiver 38, the location module 26, and the intention prediction module 22, and to at least accelerate, decelerate, and steer the vehicle 10 to drive the vehicle 10 to a desired location.

The control module 30 receives the predicted possible trajectories of the surrounding vehicles from the intention prediction module 22 and determines a lowest risk location and time for a lane change or merge. The control module 30 will determine which pair of vehicles between which the merge should be attempted and at what time the merge should occur.

Although the control module 30 is illustrated and described as a single module, it is understood that the control module 30 may be a plurality of modules configured to collectively pilot the vehicle 10 without input of an operator. In some embodiments, the control module 30 may be split into a plurality of modules, such as, for example, a planning module and a controller module.

With reference to FIG. 3, the vehicle 10 is illustrated in an example dense traffic condition. The perception module 18 is configured to detect and track vehicles 10-1-10-9 (collectively 10-X) in current lane and neighboring lanes of the vehicle 10. The perception module 18 communicates the vehicle status to the intention prediction module 22 which makes predictions as to the future behaviors of vehicles 10-X in the form of time parameterized trajectories. The time parameterized trajectories for vehicles 10-X are communicated to the control module 30 which determines a lowest risk location and time for the merge.

For example, if the vehicle 10 has the intention to merge into target lane 54, the control module 30 may determine that a lowest risk location to merge is between vehicles 10-8 and 10-9 (i.e., target vehicles or target vehicle pair) based on the trajectories of vehicles 10-6-10-9 and 10-4. The control module 30 may also determine the optimum time based on a prediction that vehicle 10-8 will decelerate in, for example, 5 seconds, creating a gap between vehicles 10-8 and 10-9.

Based on the control module's formulated policy or plan, the control module 30 will pilot the vehicle 10 to move into position to merge into the target lane 54 and execute the merge within the plan. Failures to achieve the goal of the plan, i.e. failures to merge, are handled by entering a failure recovery where the control module 30 pilots the vehicle 10 safely back in the original lane.

Figure 4:
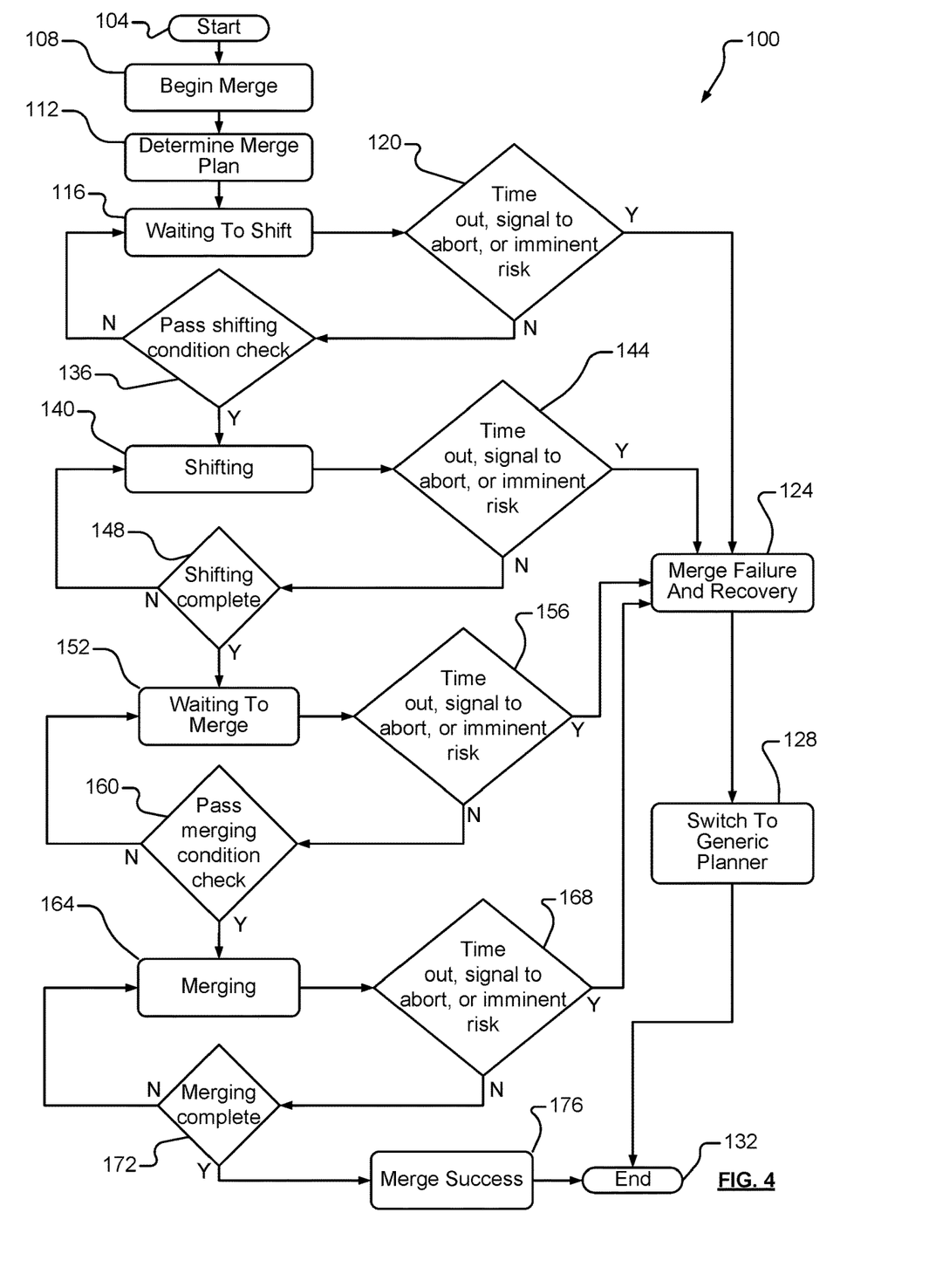
FIG. 4 illustrates a method for lane merging under dense traffic conditions in accordance with the present disclosure.

With reference to FIG. 4, an example method 100 of a lane change maneuver, and more specifically, a lane merge under dense traffic conditions, is illustrated. While the present disclosure is described as being utilized under dense traffic conditions, dense traffic conditions are not necessary for execution of method 100. Method 100 may be performed by control module 30 upon receipt of the time parameterized trajectories for vehicles 10-X.

Method 100 starts at 104. At 108 the control module 30 initiates the merge process. The merge process is generally initiated by the control module 30 based on the planned route selected by the operator of the vehicle. At 112, the control module 30 determines a policy or plan for the merge. The control module 30 makes the determination based on the time parameterized trajectories for vehicles 10-X received from the intention prediction module 22. For example, the control module 30 may determine the policy or plan of merging into target lane 54 between target vehicles 10-8, 10-9 based on the lowest risk merge path.

Figures 5A, 5B:
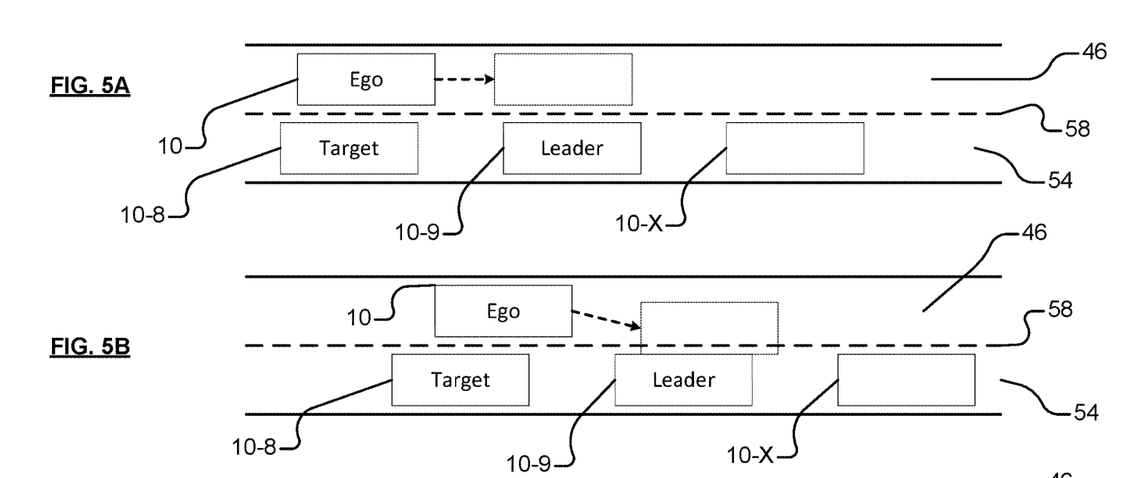
FIGS. 5A-5D illustrate a merging maneuver of the exemplary vehicle of FIG. 1.

At 116, the vehicle 10 enters a "waiting to shift" state. During the "waiting to shift" state, the control module 30 requires the vehicle 10 to meet predetermined criteria for certain named environmental conditions. For example only, the named environmental conditions may include location of the vehicle 10, location of the target vehicle (for example, vehicle 10-9), velocity of the vehicle 10, velocity of the target vehicle (for example, vehicle 10-9), etc. The predetermined criteria may include threshold ranges for a difference between the locations of the vehicle 10 and the target vehicles 10-8, 10-9, a difference between the velocities of the vehicle 10 and the target vehicles 10-8, 10-9, etc. An example "waiting to shift" state is illustrated in FIG. 5A. As illustrated, the vehicle 10 advances in its location relative to a lead target vehicle 10-9 and a target vehicle 10-8.

At 120, the control module 30 determines whether there has been a time out, a signal to abort the merge, or imminent risk. The time out may occur at a predetermined time threshold. The predetermined time threshold may be a function of the velocity of the vehicle 10 and may be set to ensure that the system 14 does not get "stuck" in the "waiting to shift" state. For example only, the time out may be set within a range of 5 to 10 seconds (s) at 40 miles per hour (mph).

The signal to abort the merge may be provided by an external component in the vehicle 10 or by the operator. For example only, the operator of the vehicle could discontinue autonomous vehicle control or enter a different or new route. Either of these options may trigger a signal to abort the merge.

Imminent risk may be determined if a surrounding vehicle's 10-X intention or function is different than the prediction generated by the intention prediction module 22. For example, if the prediction of surrounding vehicle 10-X is to slow and create a gap for the merge, and the actual actions of the vehicle 10-X are to speed up, the merge plan of the vehicle 10 is no longer low risk, and an imminent risk is triggered.

If true at 120, the control module 30 initiates failure mode and recovery at 124. In the failure mode and recovery, the control module 30 terminates the merge plan or policy and directs the vehicle back to the original lane 46 safely. The control module 30 then switches to a generic planner at 128 and ends at 132.

If false at 120, the control module 30 determines whether the vehicle 10 passes a shifting condition check at 136. The shifting condition check may include determining whether the vehicle 10 has met the predetermined criteria for the certain named environmental conditions previously discussed. For example only, the shifting condition check may include determining whether a difference in the velocity of the vehicle 10 and each of the target vehicles 10-8, 10-9 is within a predetermined range, such as 0-2 mph, and whether a difference in the locations or positions of the vehicle 10 and each of the target vehicles 10-8, 10-9 is at least a predetermined threshold, such as 5 feet (ft.).

If false at 136, method 100 returns to 116. If true at 136, the control module 30 transitions to a shifting state at 140. During the shifting state the control module 30 controls the vehicle to shift towards the target lane 54. An example of the shifting state is illustrated in FIG. 5B. As illustrated, the vehicle 10 moves in a direction toward the leader target vehicle 10-9 and slightly crosses over a lane delimiter 58 (or "lane delimiter marking" or "lane marking line") to indicate the vehicle's 10 intention to merge.

At 144, the control module 30 determines whether there has been a time out, a signal to abort the merge, or imminent risk. The signal to abort the merge and the imminent risk may be the same as those described in relation to 120. The time out may occur at a predetermined time threshold. The predetermined time threshold may be the same as previously described in relation to 120 or may be different based on the different state. The predetermined time threshold may be a function of the velocity of the vehicle 10 and may be set to ensure that the system 14 does not get "stuck" in the "shifting" state. For example only, the time out may be set within a range of 2-5 s at 40 mph.

If true at 144, the control module 30 initiates failure mode and recovery at 124. In the failure mode and recovery, the control module 30 terminates the merge plan or policy and directs the vehicle back to the original lane 46 safely. The control module 30 then switches to a generic planner at 128 and ends at 132.

If false at 144, the control module 30 determines whether shifting is compete at 148. Shifting may be complete, for example, once the vehicle 10 crosses over the lane delimiter 58.

Figure 5C:
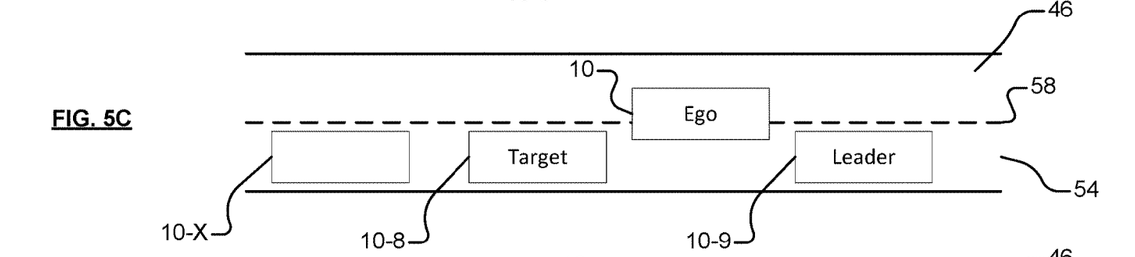

If false at 148, method 100 returns to 140. If true at 148, the control module 30 transitions to a "waiting to merge" state at 152. During the "waiting to merge" state, the control module 30 requires the vehicle 10 to meet predetermined criteria for certain named environmental conditions. For example only, the named environmental conditions may include location of the vehicle 10, location of the target vehicle (for example, vehicle 10-9), velocity of the vehicle 10, velocity of the target vehicle (for example, vehicle 10-9), etc. The predetermined criteria may include threshold ranges for a difference between the locations of the vehicle 10 and the target vehicles 10-8, 10-9, a difference between the velocities of the vehicle 10 and the target vehicles 10-8, 10-9, etc. An example "waiting to merge" state is illustrated in FIG. 5C. As illustrated, the vehicle 10 maintains its shifted location over the lane delimiter 58 and waits for lead target vehicle 10-9 and target vehicle 10-8 to create a gap for merging.

At 156, the control module 30 determines whether there has been a time out, a signal to abort the merge, or imminent risk. The signal to abort the merge and the imminent risk may be the same as those described in relation to 120. The time out may occur at a predetermined time threshold. The predetermined time threshold may be the same as previously described in relation to 120 or 144, or may be different based on the different state. The predetermined time threshold may be a function of the velocity of the vehicle 10 and may be set to ensure that the system 14 does not get "stuck" in the "waiting to merge" state. For example only, the time out may be set within a range of 5-10 s at 40 mph.

If true at 156, the control module 30 initiates failure mode and recovery at 124. In the failure mode and recovery, the control module 30 terminates the merge plan or policy and directs the vehicle back to the original lane 46 safely. The control module 30 then switches to a generic planner at 128 and ends at 132. The generic planner is a portion of the control module 30 that generates instructions for general operation of the vehicle. For example only, the generic planner generates instructions for accelerating, decelerating, following traffic signals, executing turns, etc. under normal driving conditions.

If false at 156, the control module 30 determines whether the vehicle 10 passes a merging condition check at 160. The merging condition check may include determining whether the vehicle 10 has met the predetermined criteria for the certain named environmental conditions previously discussed. For example only, the merging condition check may include determining whether a difference in the velocity of the vehicle 10 and each of the target vehicles 10-8, 10-9 is within a predetermined range, such as 0-2 mph, and whether a difference in the locations or positions of the target vehicles 10-8, 10-9 is at least a predetermined threshold, such as 15 ft.

Figure 5D:
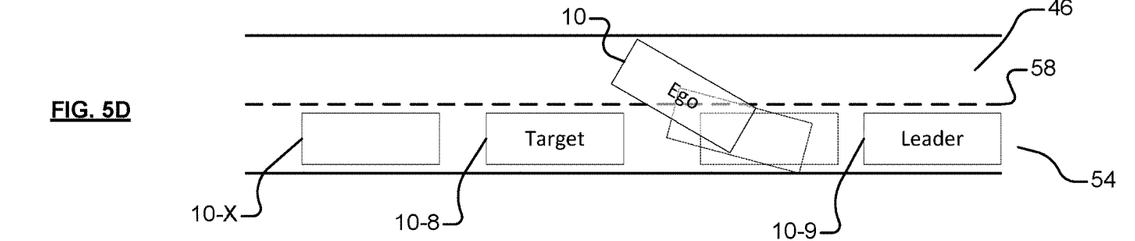

If false at 160, method 100 returns to 152. If true at 160, the control module 30 transitions to a merging state at 164. In the merging state, the control module 30 directs the vehicle 10 to merge into the target lane 54. An example of the merge state is illustrated in FIG. 5D. As illustrated, the vehicle 10 merges between the lead target vehicle 10-9 and the target vehicle 10-8 in the target lane 54, completing the merge.

At 168, the control module 30 determines whether there has been a time out, a signal to abort the merge, or imminent risk. The signal to abort the merge and the imminent risk may be the same as those described in relation to 120. The time out may occur at a predetermined time threshold. The predetermined time threshold may be the same as previously described in relation to 120, 144 or 156, or may be different based on the different state. The predetermined time threshold may be a function of the velocity of the vehicle 10 and may be set to ensure that the system 14 does not get "stuck" in the merging state. For example only, the time out may be set within a range of 2-5 s at 40 mph.

If true at 168, the control module 30 initiates failure mode and recovery at 124. In the failure mode and recovery, the control module 30 terminates the merge plan or policy and directs the vehicle back to the original lane 46 safely. The control module 30 then switches to a generic planner at 128 and ends at 132.

If false at 168, the control module 30 determines whether the merge is complete at 172. The merge may be complete if, for example, all wheels have crossed over the lane delimiter 58. If false, method 100 returns to 164. If true at 172, the control module 30 returns a merge success state at 176. The method 100 then ends at 132.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An autonomous drive system for a vehicle comprising:
   at least one environment perception sensor located on the vehicle, the at least one environment perception sensor being configured to detect at least one of a position, velocity, acceleration, and orientation of a vehicle within a detection range of the at least one environment perception sensor;
   a perception circuit configured to receive signals from the at least one environment perception sensor and detect and track a first remote vehicle and a second remote vehicle in one or both of a current lane and a neighboring lane;
   a location circuit configured to determine a location of the vehicle;
   an intention prediction circuit configured to generate predicted trajectories for the first remote vehicle and the second remote vehicle, the intention prediction circuit being configured to generate the predicted trajectories from velocities, accelerations, orientations, and positions of the first remote vehicle and the second remote vehicle tracked by the perception circuit, the predicted trajectories generated by the intention prediction circuit providing predictions for whether the first remote vehicle and the second remote vehicle will speed up, slow down, maintain current velocities, maintain close following distances, allow gaps, and change lanes; and a controller configured to receive signals from the at least one environment perception sensor and receive the predicted trajectories from the intention prediction circuit, wherein the controller determines a location and time for a lane change based on the predicted trajectories and controls the vehicle to change lanes at the determined location and time.

2. The autonomous drive system of claim 1, wherein the controller completes a waiting to shift stage, a shifting stage, a waiting to merge stage, and a merging stage when the controller controls the vehicle to change lanes at the determined location and time.

3. The autonomous drive system of claim 2, wherein the controller determines whether a distance between the vehicle and each of the first remote vehicle and the second remote vehicle is less than a predetermined distance threshold and whether a difference in a velocity of the vehicle and velocities of the first remote vehicle and the second remote vehicle is less than a predetermined velocity threshold during the waiting to shift stage.

4. The autonomous drive system of claim 2, wherein the controller shifts the vehicle in a direction toward a lead vehicle of the first remote vehicle and the second remote vehicle during the shifting stage.

5. The autonomous drive system of claim 4, wherein the shifting stage is complete when the controller controls the vehicle to cross over a lane delimiter and into the neighboring lane.

6. The autonomous drive system of claim 2, wherein the controller determines whether a distance between the first remote vehicle and the second remote vehicle is greater than a predetermined distance threshold and whether a difference in a velocity of the vehicle and velocities of the first remote vehicle and the second remote vehicle is less than a predetermined velocity threshold during the waiting to merge stage.

7. The autonomous drive system of claim 2, wherein the controller shifts the vehicle into the neighboring lane from the current lane at the determined location and time during the merging stage.

8. The autonomous drive system of claim 7, wherein the merging stage is complete when the vehicle has completely crossed over a lane delimiter and the neighboring lane becomes a new current lane for the vehicle.

9. The autonomous drive system of claim 2, wherein if a time spent in a stage exceeds a predetermined threshold, the controller initiates a merge failure recovery and controls the vehicle back into the current lane.

10. The autonomous drive system of claim 2, wherein, if an abort signal is received or if one of the first remote vehicle and the second remote vehicle follows a path different than the predicted trajectories that increases a risk as determined by the intention prediction circuit, the controller initiates a merge failure recovery and controls the vehicle back into the current lane.

11. A method for controlling an autonomous vehicle comprising:

determining, by a location circuit, a location of the autonomous vehicle;

detecting, by at least one environment perception sensor located on the autonomous vehicle, at least one of a position, velocity, acceleration, and orientation, of at least one remote vehicle within a detection range of the at least one environment perception sensor;

detecting and tracking, by a perception circuit, an output of the at least one environment perception sensor for a first remote vehicle and a second remote vehicle in one or both of a current lane and a neighboring lane;

generating, by an intention prediction circuit, predicted trajectories for the first remote vehicle and the second remote vehicle from velocities, accelerations, orientations, and position of the first remote vehicle and the second remote vehicle tracked by the perception circuit, the predicted trajectories generated by the intention prediction circuit providing predictions for whether the first remote vehicle and the second remote vehicle will speed up, slow down, maintain current velocities, maintain close following distances, allow gaps, and change lanes;

determining, by a controller, a location and time for a lane change based on the predicted trajectories for the at least two remote vehicles; and controlling, by the controller, the vehicle to change lanes at the determined location and time.

12. The method of claim 11, further comprising completing, by the controller, a waiting to shift stage, a shifting stage, a waiting to merge stage, and a merging stage while controlling, by the controller, the vehicle to change lanes at the determined location and time.

13. The method of claim 12, further comprising determining, by the controller, whether a distance between the vehicle and each of the first remote vehicle and the second remote vehicle is less than a predetermined distance threshold and whether a difference in a velocity of the vehicle and velocities of the first remote vehicle and the second remote vehicle is less than a predetermined velocity threshold during the waiting to shift stage.

14. The method of claim 12, further comprising shifting, by the controller, the vehicle in a direction toward a lead vehicle of the first remote vehicle and the second remote vehicle during the shifting stage.

15. The method of claim 14, further comprising completing, by the controller, the shifting stage when the vehicle crosses over a lane delimiter and into the neighboring lane.

16. The method of claim 12, further comprising determining, by the controller, whether a distance between the first remote vehicle and the second remote vehicle is greater than a predetermined distance threshold and whether a difference in a velocity of the vehicle and velocities of the first remote vehicle and the second remote vehicle is less than a predetermined velocity threshold during the waiting to merge stage.

17. The method of claim 12, further comprising controlling, by the controller, the vehicle to change lanes between the current lane and the neighboring lane at the determined location and time during the merging stage.

18. The method of claim 17, further comprising completing, by the controller, the merging stage when the vehicle has completely crossed over a lane delimiter and the neighboring lane becomes a new current lane for the vehicle.

19. The method of claim 12, further comprising initiating, by the controller, a merge failure recovery if a time spent in a stage exceeds a predetermined time threshold, and controlling, by the controller, the vehicle back into the current lane.

20. The method of claim 12, further comprising initiating, by the controller, a merge failure recovery if an abort signal is received or if one of the first remote vehicle and the second remote vehicle follows a path different than the predicted trajectories that increases a risk as determined by the intention prediction circuit, and controlling, by the controller, the vehicle back into the current lane.

* * * * *